United States Patent
Baker Kreiser et al.

(10) Patent No.: US 9,849,982 B1
(45) Date of Patent: Dec. 26, 2017

(54) RESCUE HOIST END-EFFECTOR

(71) Applicant: Goodrich Corporation, Charlotte, NC (US)

(72) Inventors: Annina M. Baker Kreiser, King of Prussia, PA (US); David L. Kreiser, King of Prussia, PA (US); Ryan Brown, Princeton, NJ (US); John Michael Burke, East Rutherford, NJ (US); Aidan J. Rischmann, Darien, CT (US)

(73) Assignee: Goodrich Corporation, Charlotte, NC (US)

( * ) Notice: Subject to any disclaimer, the term of this patent is extended or adjusted under 35 U.S.C. 154(b) by 0 days.

(21) Appl. No.: 15/481,711

(22) Filed: Apr. 7, 2017

(51) Int. Cl.
| | | |
|---|---|---|
| *B63C 9/01* | (2006.01) | |
| *B64D 1/22* | (2006.01) | |
| *A62B 1/02* | (2006.01) | |
| *B63C 9/26* | (2006.01) | |
| *B66D 3/18* | (2006.01) | |
| *B25J 15/00* | (2006.01) | |

(52) U.S. Cl.
CPC .................. *B64D 1/22* (2013.01); *A62B 1/02* (2013.01); *A61G 2220/10* (2013.01); *B25J 15/00* (2013.01); *B63C 9/26* (2013.01); *B66D 3/18* (2013.01)

(58) Field of Classification Search
CPC .... B64D 1/22; A62B 1/02; B63C 9/01; B63C 9/02
See application file for complete search history.

(56) References Cited

U.S. PATENT DOCUMENTS

| | | | |
|---|---|---|---|
| 4,113,207 A | 9/1978 | Dalziel | |
| 5,494,240 A | 2/1996 | Waugh | |
| 8,646,728 B2 | 2/2014 | Schuster | |
| 2014/0209735 A1 | 7/2014 | Corey | |
| 2016/0009393 A1* | 1/2016 | Repp ........................ | B64D 1/22 |
| | | | 701/34.4 |
| 2016/0325454 A1* | 11/2016 | Povroznik, III ....... | B26D 5/086 |

FOREIGN PATENT DOCUMENTS

DE      102005006936 A1    8/2006

* cited by examiner

*Primary Examiner* — Stephen P Avila
(74) *Attorney, Agent, or Firm* — Kinney & Lange, P.A.

(57) ABSTRACT

An end-effector for a hoist includes a drive and an articulating arm. The articulating arm includes support disks, control cables extending through the support disks, and a hoist cable extending through the support disks. The drive includes an actuator connected to one of the control cables. The actuator deploys and retracts the control cables, thereby displacing the articulating arm from an end-effector axis. The drive also includes a stabilizer mounted on a drive housing, the stabilizer generates a stabilizing moment in response to the articulating arm displacing from the end-effector axis.

20 Claims, 10 Drawing Sheets

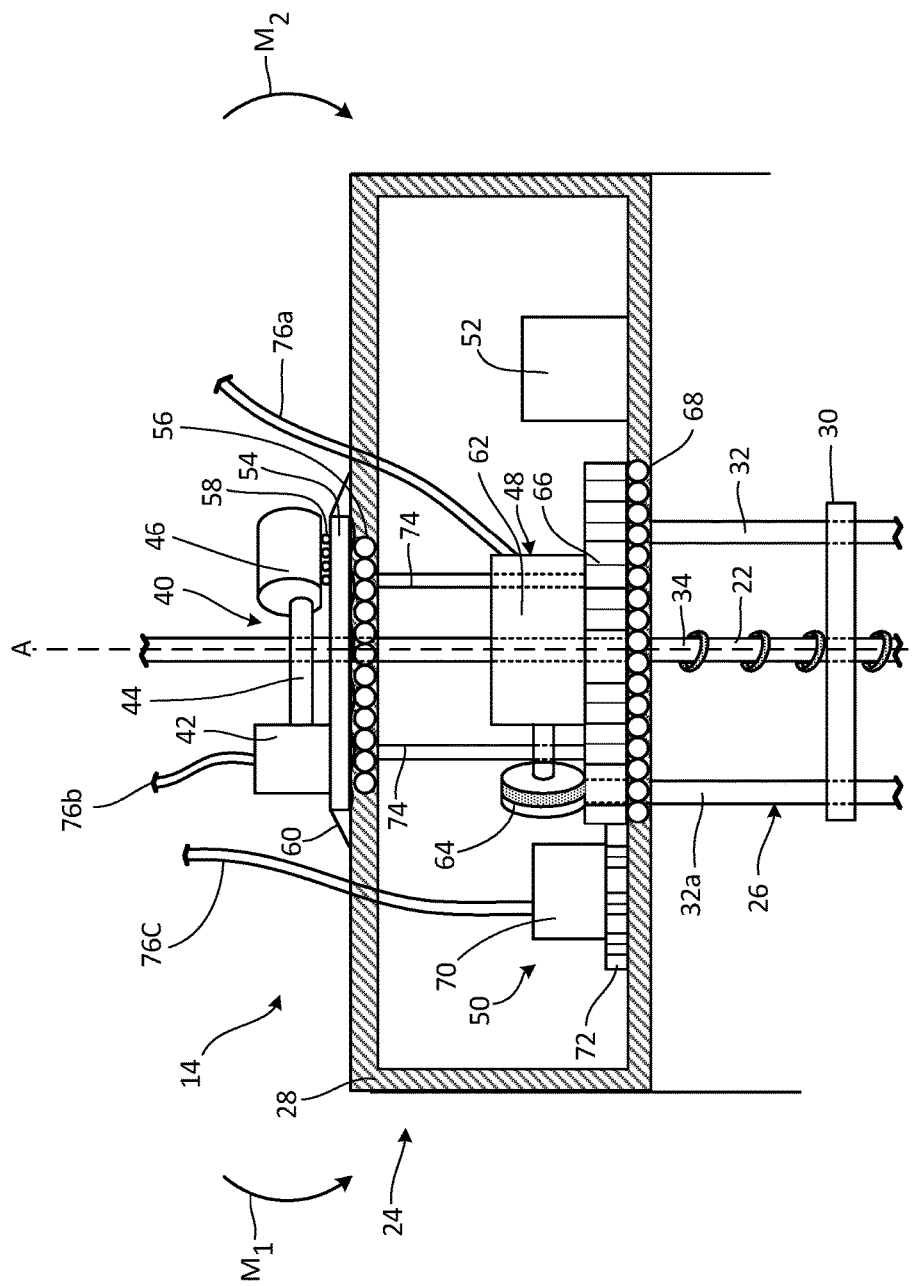

US 9,849,982 B1

RESCUE HOIST END-EFFECTOR

BACKGROUND

The present disclosure relates generally to hoists. More particularly, this disclosure relates to rescue hoists for aircraft.

Hoists are utilized to deploy and retrieve a cable from a cable drum to hoist persons and cargo to and from the aircraft. The hoists are used for a variety of applications, including remote location supply and retrieval operations, construction, and search and rescue operations. Generally, the hoist systems are manually operated by a crewmember in an open doorway who visually guides the attachment end of the hoist cable. Considerable skill is required to properly position the attachment end and the hoist cable, particularly in gusting conditions, at challenging cliff-side locations, and on rolling seas. During operation, the crewmember controls the extension and retraction of the hoist cable. To position the attachment end over the target object, the crewmember communicates position control information to the pilot, and the pilot repositions the aircraft relative to the target object.

SUMMARY

According to one aspect of the disclosure, an end-effector for a rescue hoist includes an articulating arm and a drive. The articulating arm includes a plurality of support disks, a plurality of control cables extending through the plurality of support disks, and a hoist cable extending through the plurality of support disks. The drive includes an actuator connected to a first one of the plurality of control cables and configured to deploy and retract the first one of the plurality of control cables to displace the articulating arm from an end-effector axis, and a stabilizer mounted on a drive housing and configured to generate a stabilizing moment in response to the articulating arm displacing from the end-effector axis.

According to another aspect of the disclosure, a rescue hoist includes a hoist housing, an effector cable extending from the hoist housing, and an end-effector disposed at a distal end of the effector cable. The end-effector includes an articulating arm and a drive. The articulating arm includes a plurality of support disks, a plurality of control cables extending through the plurality of support disks, and a hoist cable extending through the plurality of support disks. The drive includes an actuator connected to a first one of the plurality of control cables and configured to deploy and retract the first one of the plurality of control cables to displace the articulating arm from an end-effector axis, and a stabilizer mounted on a drive housing and configured to generate a stabilizing moment in response to the articulating arm displacing from the end-effector axis.

BRIEF DESCRIPTION OF THE DRAWINGS

FIG. 3A is a cross-sectional, side elevation view of a drive of an end-effector.

DETAILED DESCRIPTION

Figure 1A:
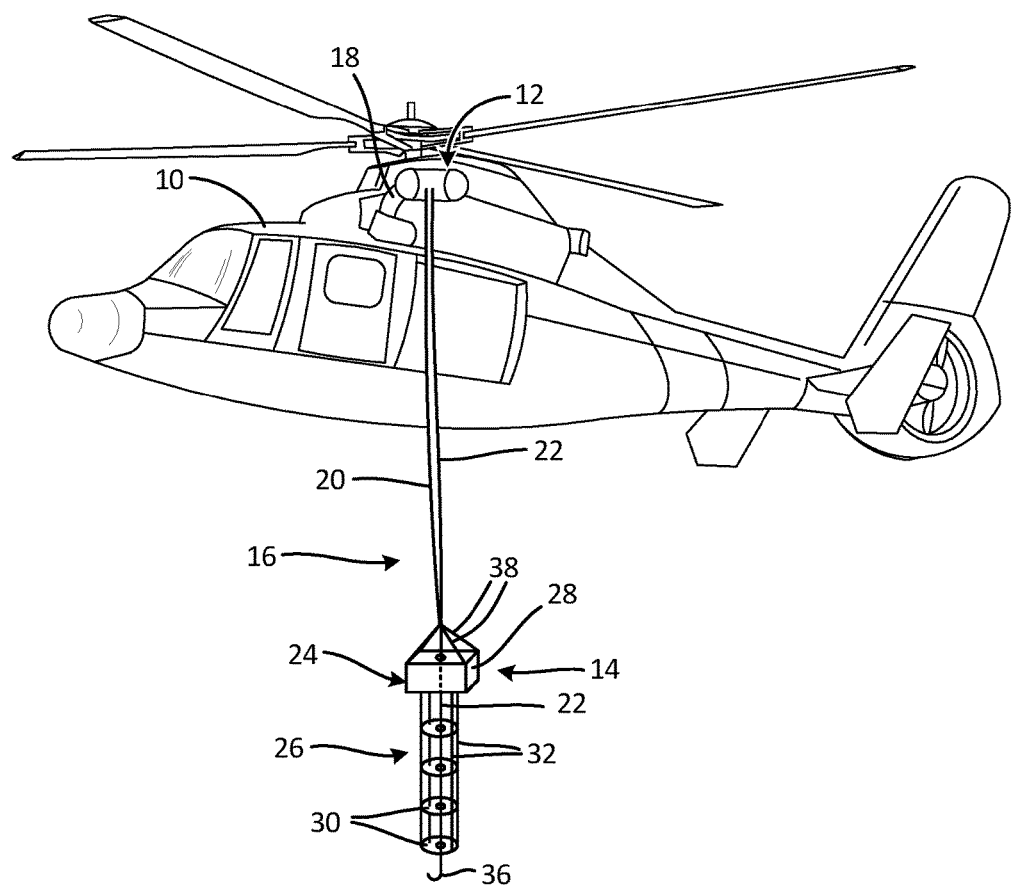
FIG. 1A is an isometric view of an aircraft, rescue hoist, end-effector, and a cable system.
Figure 1B:
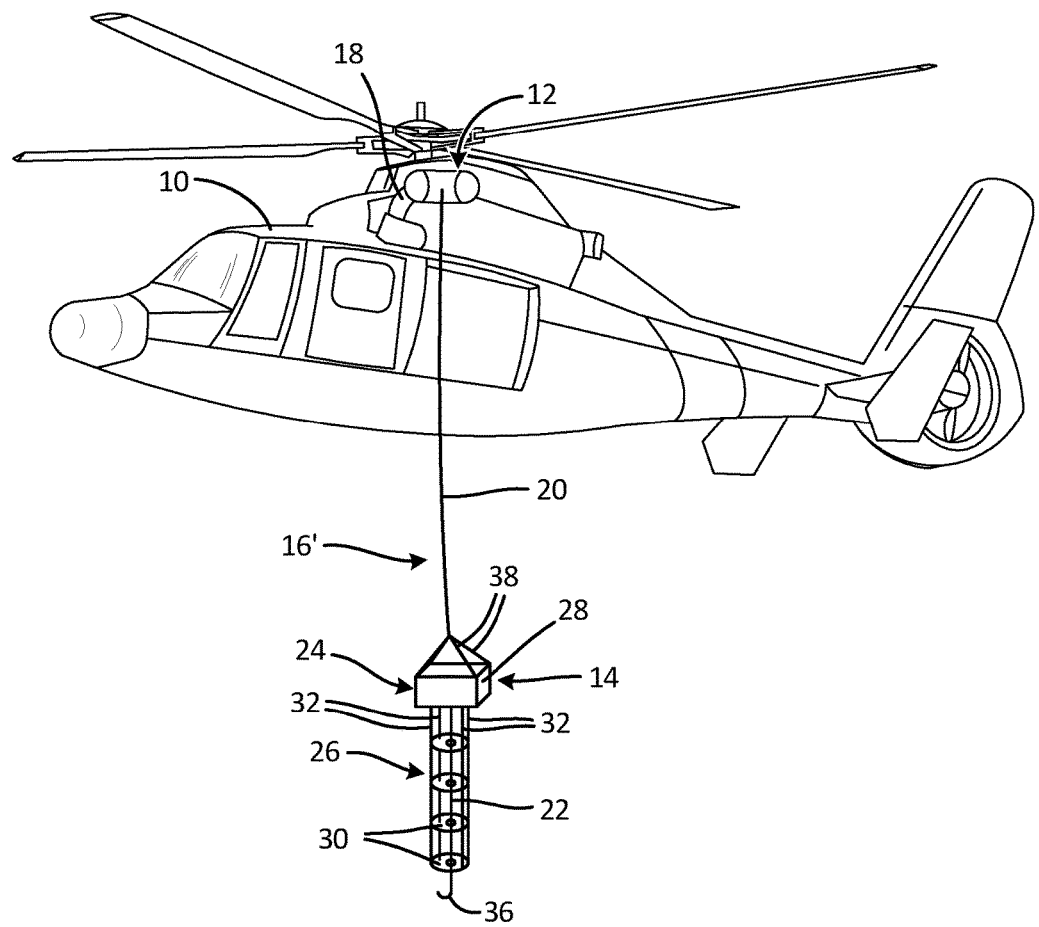
FIG. 1B is an isometric view of an aircraft, rescue hoist, end-effector, and a cable system.
Figure 1C:
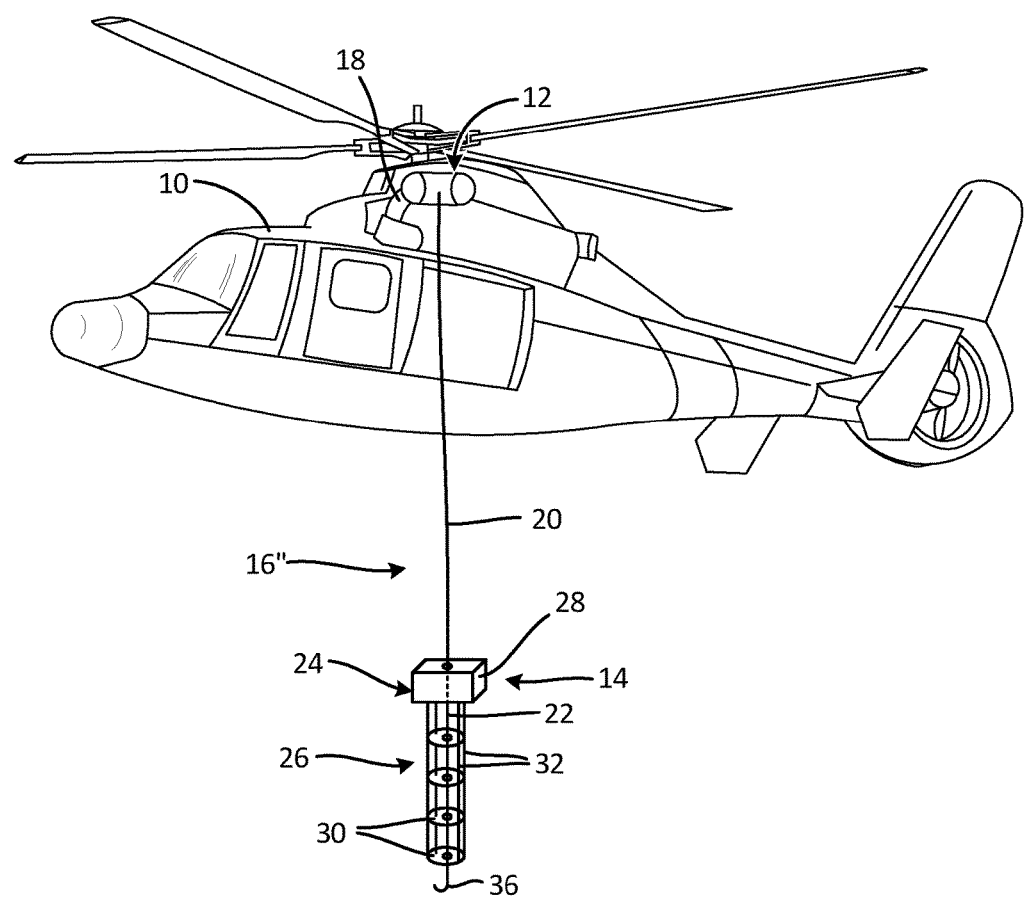
FIG. 1C is an isometric view of an aircraft, rescue hoist, end-effector, and a cable system.

FIG. 1A is an isometric view of aircraft 10, rescue hoist 12, end-effector 14, and cable system 16. FIG. 1B is an isometric view of aircraft 10, rescue hoist 12, end-effector 14, and cable system 16'. FIG. 1C is an isometric view of aircraft 10, rescue hoist 12, end-effector 14, and cable system 16". FIGS. 1A-1C will be discussed together. Rescue hoist 12 is mounted to aircraft by support 18, and rescue hoist 12 includes cable system 16. Cable system 16 includes effector cable 20 and hoist cable 22. End-effector 14 includes drive 24 and articulating arm 26. Drive housing 28 of drive 24 is shown. Articulating arm 26 includes support disks 30 and control cables 32. Effector cable 20 extends from rescue hoist 12 and supports end-effector 14. Hoist cable 22 extends through articulating arm 26 and includes attachment member 36. While rescue hoist 12 is described as mounted to aircraft 10, it is understood that rescue hoist 12 can be mounted at any suitable location for recovering or delivering a target object, such as on a ship, a crane, a building, or some any other desired platform.

Articulating arm 26 extends from drive housing 28. Control cables 32 extend from drive housing 28 and through support disks 30. Hoist cable 22 similarly extends through support disks 30. In some examples, elastic members 34 (shown in FIGS. 2A-5) are disposed between adjacent support disks 30. Support disks 30 form joints in articulating arm 26 that enable the displacement of articulating arm 26 to an articulated position (shown in FIG. 2C). Elastic members 34 support each support disk 30 relative adjacent support disks 30, thereby maintaining a desired separation between support disks 30. Attachment member 36 is connected to a distal end of hoist cable 22, which is collocated with the distal end of articulating arm 26. It is understood that attachment member 36 can be any suitable device for connecting to a target object, such as a hook, a loop, a harness, or any other suitable device.

During operation, components of drive 24 (discussed in more detail in FIGS. 3A-3B) alter a length of one or more control cables 32 to cause articulating arm 26 to displace to the articulated position. In some examples, drive 24 retracts one control cable 32 into drive housing 28 to displace articulating arm 26. Retracting one control cable 32 causes the distal end of articulating arm 26 to articulate in the direction of the retracted control cable 32, thereby shifting articulating arm 26 to the articulated position. In some examples, articulating arm 26 can be rotated to provide a 360° delivery envelope for attachment member 36. In some examples, multiple control cables 32 can be retracted by drive 24, thereby enabling articulating arm 26 to displace in any desired direction.

Each of cable system 16, cable system 16', and cable system 16" includes effector cable 20 and hoist cable 22. Effector cable 20 supports end-effector 14, and hoist cable 22 extends through articulating arm 26 and supports attachment member 36.

Cable system 16 is shown in FIG. 1A. In cable system 16, effector cable 20 extends from rescue hoist 12 and includes support cables 38. Support cables 38 extend from a distal end of effector cable 20 and connect to drive housing 28. Similar to effector cable 20, hoist cable 22 extends from rescue hoist 12 and through end-effector 14. Hoist cable 22 extends through drive 24 and articulating arm 26. Hoist cable 22 supports attachment member 36 at a distal end of articulating arm 26. With both effector cable 20 and hoist cable 22 extending from rescue hoist 12, a length of articulating arm 26 can be controlled by extending or retracting one of effector cable 20 and hoist cable 22 while holding the length of the other one of hoist cable 22 and effector cable 20 steady. For example, articulating arm 26 can be shifted from a deployed state (discussed in FIG. 2A) to a retracted state (discussed in FIG. 2B) by retracting hoist cable 22 without altering the length of effector cable 20.

Cable system 16' is shown in FIG. 1B. In cable system 16', effector cable 20 extends from rescue hoist 12 and includes support cables 38. Support cables 38 extend from a distal end of effector cable 20 and connect to drive housing 28. Hoist cable 22 extends from drive 24 and through articulating arm 26. End-effector 14 can thus be installed on an existing rescue hoist 12 and can include only a single cable extending from rescue hoist 12. As such, end-effector 14 can be attached to a distal end of the existing cable of the rescue hoist 12 to retrofit rescue hoist 12 for use with end-effector 14.

Cable system 16" is shown in FIG. 1C. In cable system 16", effector cable 20 and hoist cable 22 are integrally formed such that a single cable forms both effector cable 20 and hoist cable 22. Effector cable 20 extends from rescue hoist 12 and through end-effector 14. A portion of effector cable 20 extending through articulating arm 26 forms hoist cable 22. In this example, end-effector 14 is supported on effector cable 20 by elastic members 34 (best seen in FIGS. 4 and 5) disposed between support disks 30. Elastic members 34 are sufficiently robust to support the weight of both drive 24 and support disks 30. End-effector 14 can thus be installed on an existing rescue hoist 12, and the cable of the rescue hoist 12 can be utilized to form both effector cable 20 and hoist cable 22.

End-effector 14 provides significant advantages. End-effector 14 provides at least two additional degrees of hook-end positioning freedom. Manipulating articulating arm 26 provides finer positioning control once attachment member 36 is in the rough vicinity of the target object, thereby increasing safety for both the crewmember and the target object. Moreover, the additional positioning capabilities enables the recovery of objects that were previously unreachable by a standard cable, such as objects located under a cliff face or overhang. Articulating arm 26 can also be manipulated to compensate for small lateral movements of aircraft 10 and of the target object. End-effector 14 also enables retrofitting of existing hoist systems to provide additional hook-end positioning freedom.

Figure 2A:
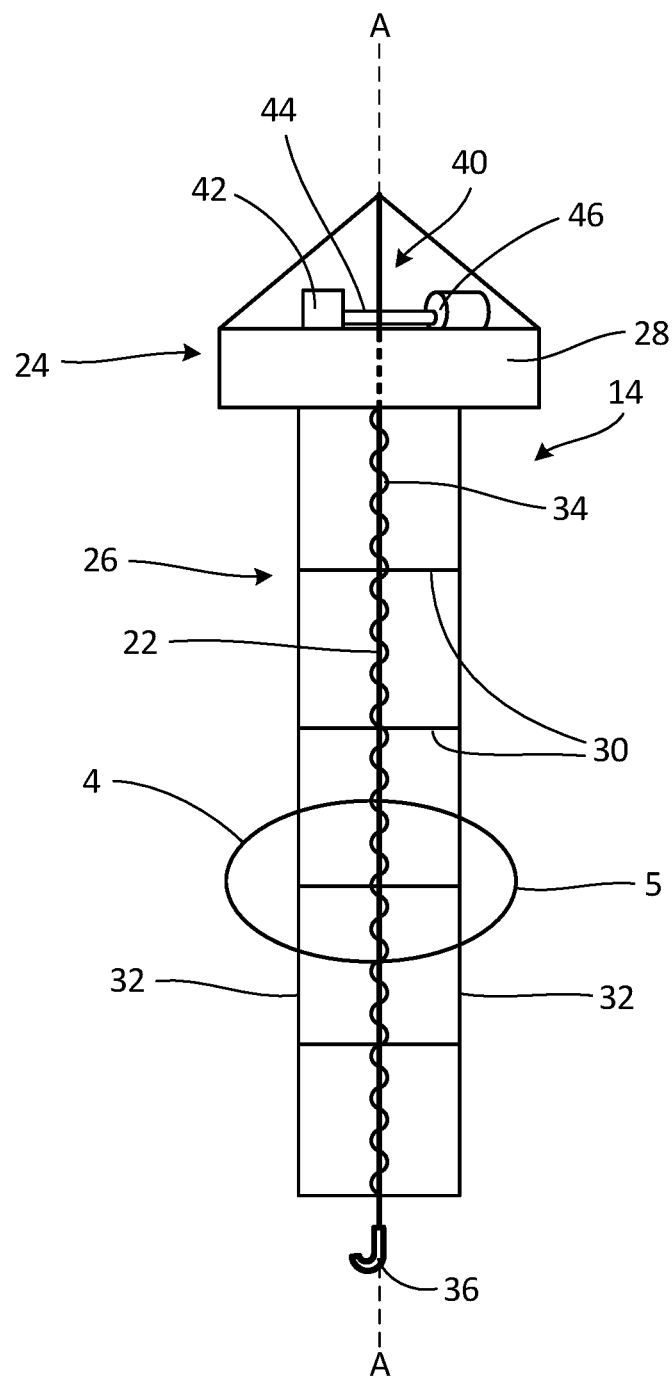
FIG. 2A is a side elevation view of an end-effector in an extended state.
Figure 2B:
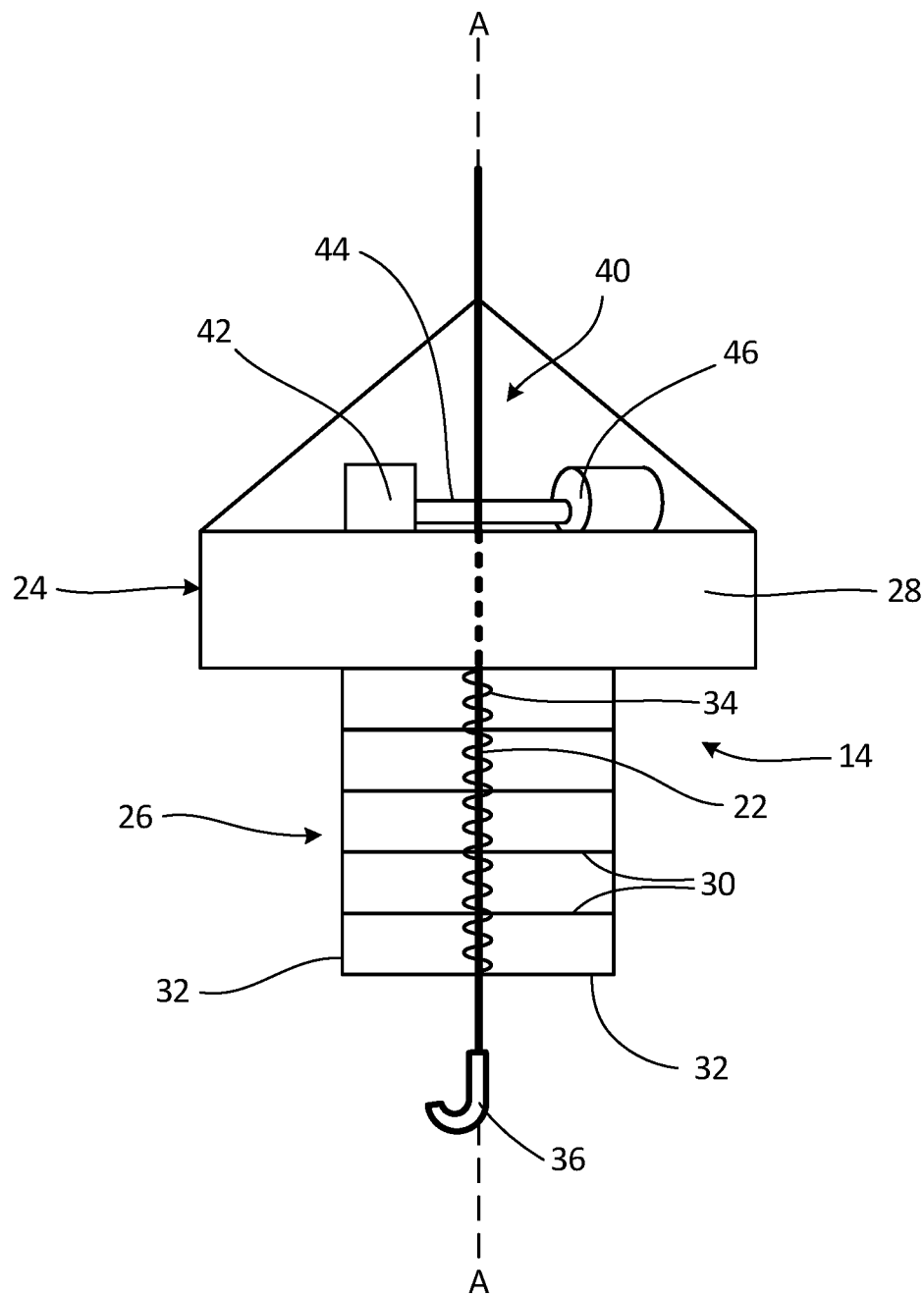
FIG. 2B is a side elevation view of an end-effector in a retracted state.
Figure 2C:
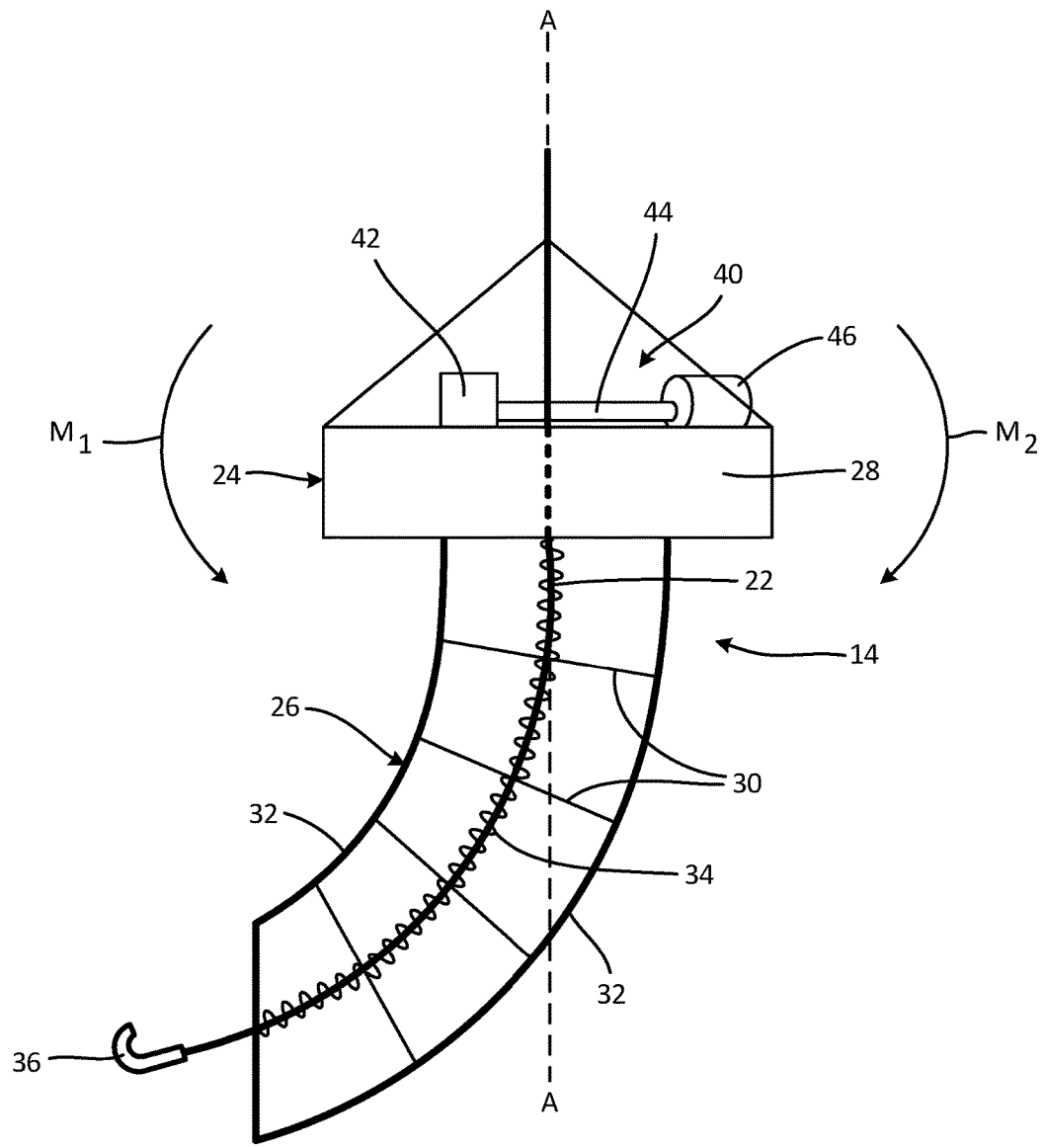
FIG. 2C is a side elevation view of an end-effector in an articulated state.

FIG. 2A is a side elevation view of end-effector 14 in an extended state. FIG. 2B is a side elevation view of end-effector 14 in a retracted state. FIG. 2C is a side elevation view of end-effector 14 in an articulated state. FIGS. 2A-2C will be discussed together. End-effector 14 includes drive 24 and articulating arm 26. Drive housing 28 and stabilizer 40 of drive 24 are shown. Articulating arm 26 includes support disks 30, control cables 32, and elastic members 34. Stabilizer 40 includes stabilizer motor 42, displacement device 44, and counterweight 46. Hoist cable 22 extends through articulating arm 26, and attachment device 36 is disposed at a distal end of hoist cable 22.

Figure 3B:
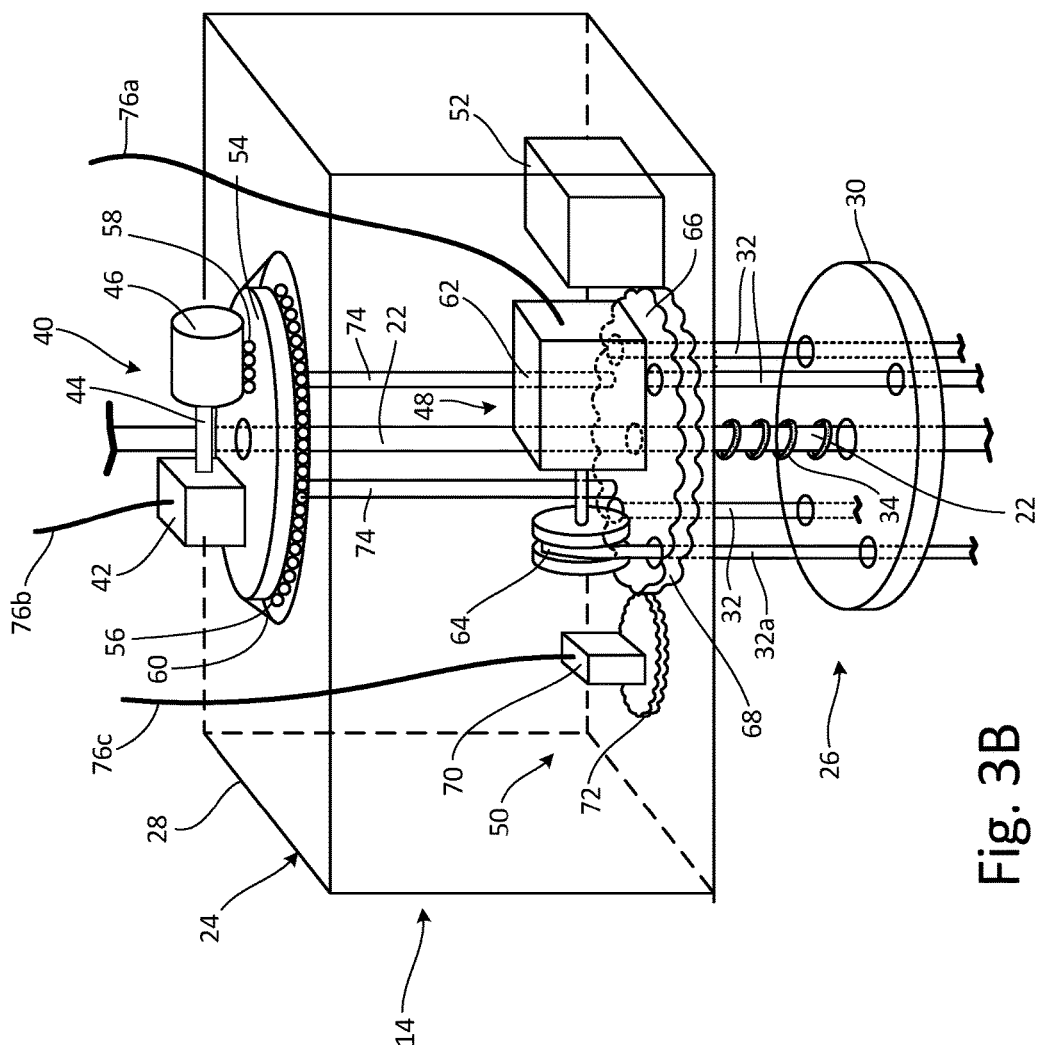
FIG. 3B is a cross-sectional, isometric view of a drive of an end-effector.

Articulating arm 26 extends from drive housing 28 and is controlled by internal components within drive 24 (discussed in detail in FIGS. 3A and 3B). Control cables 32 extend from drive 24 through support disks 30. Control cables 32 extend through each support disk 30 proximate an edge of each support disk 30, and control cables 32 are evenly arrayed about each support disk 30. Hoist cable 22 extends through each support disk 30 proximate a center of each support disk 30. Support disks 30 form joints in articulating arm 26 that enable the displacement of articulating arm 26 to the articulated position shown in FIG. 2C. Elastic members 34 extend around hoist cable 22 and are disposed between adjacent support disks 30. Elastic members 34 support each support disk 30 relative adjacent support disks 30, thereby maintaining a desired separation between support disks 30. Attachment member 36 is connected to a distal end of hoist cable 22, which is collocated with distal end of articulating arm 26. In some examples, support disks 30 include bushings through which control cables 32 and hoist cable 22 extend. The bushings allow control cables 32 and hoist cable 22 to slide through support disks 30. In some examples, support disks 30 are not directly connected to either control cables 32 or hoist cable 22 and are instead supported by elastic members 34.

Stabilizer 40 is disposed on drive housing 28. Stabilizer motor 42 is disposed on drive housing 28 and is configured to communicate with a hoist control system located on aircraft 10. It is understood that stabilizer motor 42 can communicate with the control system in any desired manner, such as through a wired or wireless connection. Counterweight 46 is similarly disposed on drive housing 28. Displacement device 44 extends from stabilizer motor 42 and is connected to counterweight 46.

During operation, end-effector 14 is lowered from rescue hoist 12 by lowering effector cable 20 (shown in FIGS. 1A-1C). A crewmember controls the extension and retraction of effector cable 20 and hoist cable 22. In some examples, articulating arm 26 can be shifted between the retracted state shown in FIG. 2B and the extended state shown in FIG. 2A during operation. For example, where effector cable 20 is separate from hoist cable 22, hoist cable 22 can be retracted while effector cable 20 remains steady, thereby causing articulating arm 26 to simultaneously retract to the retracted position shown in FIG. 2B.

End-effector 14 provides an increased delivery radius for attachment member 36. When effector cable 20 has been lowered from aircraft 10 (shown in FIGS. 1A-1C) to a position proximate a target object, end-effector 14 can be manipulated by the crewmember through the hoist control system to position attachment member 36 at a desired location relative the target object. The crewmember can instruct end-effector 14 to displace articulating arm 26 to the articulated position shown in FIG. 2C. In some examples, drive 24 retracts one control cable 32 into drive housing 28 to displace articulating arm 26. Retracting one control cable 32 causes the distal end of articulating arm 26 to articulate in the direction of the retracted control cable 32, thereby shifting articulating arm 26 to the articulated position. Articulating arm 26 can also be rotated about axis A-A, and as such articulating arm 26 provides a 360° delivery envelope for attachment member 36. In some examples, multiple control cables 32 can be retracted by drive 24, thereby enabling articulating arm 26 to displace in any desired direction off of axis A-A.

With articulating arm 26 in the articulated position, moment $M_1$ (shown in FIG. 2C) is created by attachment member 36 and the portion of articulating arm 26 displaced from axis A-A. To counter moment $M_1$, stabilizer 40 generates moment $M_2$ (shown in FIG. 2C), thereby balancing end-effector 14. When articulating arm 26 begins to displace from axis A-A, stabilizer motor 42 receives a signal from hoist control system instructing stabilizer 40 to generate the moment $M_2$. Stabilizer motor 42 drives displacement device 44 in response to the signal, and displacement device 44 in turn drives counterweight 46. Counterweight 46 is extended a distance required to create moment $M_2$, thereby balancing end-effector 14 when articulating arm 26 is in the articulated state. In some examples, displacement device 44 can be a piston, a screw, or any other suitable linear displacement device. In some examples, displacement device 44 includes an extendable and rotating arm that supports counterweight 46 and is connected to stabilizer motor 42. With counterweight 46 mounted on the rotating arm, stabilizer 40 is able to generate moment $M_2$ to counter moment $M_1$ regardless of the direction of articulation.

End-effector 14 provides significant advantages. End-effector 14 provides at least two additional degrees of hook-end positioning freedom. This allows the crewmember to manipulate articulating arm 26 to deploy attachment member 36 within a roughly bell-shaped volume around axis A-A. Manipulating articulating arm 26 provides finer positioning control once attachment member 36 is in the rough vicinity of the target object, thereby increasing safety for both the crewmember and the target object. Moreover, the additional positioning capabilities enables the recovery of objects that were previously unreachable by a standard cable, such as objects located under a cliff face or overhang. In addition, articulating arm 26 can be manipulated to compensate for small lateral movements of aircraft 10 and of the target object.

FIG. 3A is a cross-sectional, side elevation view of drive 24 of end-effector 14. FIG. 3B is a cross-sectional, isometric view of drive 24 of end-effector 14. FIGS. 3A and 3B will be discussed together. End-effector 14 includes drive 24 and articulating arm 26. Articulating arm 26 includes support disks 30, control cables 32, and elastic members 34. Drive 24 includes drive housing 28, stabilizer 40, actuator 48, rotator 50, and balance mass 52. Stabilizer 40 includes stabilizer motor 42, displacement device 44, counterweight 46, stabilizer disk 54, disk bearing 56, counterweight bearing 58, and disk cover 60. Actuator 48 includes actuator motor 62, spool 64, actuator gear 66, and bearing 68. Rotator 50 includes rotation motor 70, drive gear 72, and connectors 74. Hoist cable 22 extends through articulating arm 26.

Articulating arm 26 extends from drive housing 28. Control cables 32 extend through and are supported on actuator gear 66. Control cables 32 further extend from actuator gear 66 and through support disks 30. In some examples, control cables 32 are connected to actuator gear 66. In other examples, control cables 32 can translate through actuator gear 66 and into drive housing 28. Control cable 32a extends through actuator gear 66 and is wound on spool 64. In one example, control cables 32 are wound into and stored within drive housing 28 when articulating arm 26 is in the retracted state (shown in FIG. 2B). Drive 24 can include a winding device, such as a torsion spring, to wind control cables 32 as control cables 32 retract into drive housing 28. Winding control cables 32 onto the winding device as control cables 32 enter drive housing 28 prevents control cables 32 from tangling within drive housing 28.

Similar to control cables 32, hoist cable 22 extends through actuator gear 66 and through support disks 30. Control cables 32 are disposed about a perimeter of actuator gear 66 and support disks 30, while hoist cable 22 extends through a center of actuator gear 66 and a center of support disks 30. In addition to extending through actuator gear 66 and support disks 30, it is understood that hoist cable 22 can extend through stabilizer disk 54 and, in some examples, can extend to rescue hoist 12 (shown in FIGS. 1A-1C). With control cables 32 extending into or through actuator gear 66, rotating actuator gear 66 causes articulating arm 26 to simultaneously rotate. In one example, actuator gear 66 is supported for rotation by bearing 68.

Actuator 48 is disposed within drive housing 28 on actuator gear 66. Actuator motor 62 is disposed on actuator gear 66 and configured to drive spool 64. Spool 64 winds control cable 32a to shorten the length of control cable 32a extending outside of drive housing 28, thereby causing articulating arm 26 to articulate towards control cable 32a. Actuator motor 62 communicates with a hoist control system located on aircraft 10 (shown in FIGS. 1A-1C) via communication link 76a. Communication link 76a can be a wired or wireless connection.

Stabilizer 40 is mounted on drive housing 28. Stabilizer disk 54 is disposed at a top of drive housing 28, and disk bearing 56 is disposed between stabilizer disk 54 and drive housing 28 to allow stabilizer disk 54 to rotate relative to drive housing 28. Disk cover 60 extends around stabilizer disk 54 and isolates disk bearing 56 from the environment to prevent contamination of disk bearing 56. Stabilizer motor 42 is disposed on stabilizer disk 54 and communicates with the hoist control system via communication link 76b. Displacement device 44 extends from stabilizer motor 42 and is connected to counterweight 46. Displacement device 44 is driven by stabilizer motor 42, and displacement device 44 displaces counterweight 46 to generate moment $M_2$ to compensate for moment $M_1$ created when articulating arm 26 displaces from axis A-A. Counterweight 46 is disposed on stabilizer disk 54 with counterweight bearing 58 disposed between counterweight 46 and stabilizer disk 54. In some examples, counterweight 46 is disposed on an opposite side of axis A-A from spool 64. With counterweight 46 disposed on an opposite side of axis A-A, any moment generated by counterweight 46 will be opposite the moment $M_1$ generated by articulating arm 26 because articulating arm 26 displaced towards spool 64. As such, displacement device 44 can be a screw, a piston, or any other suitable linear displacement device.

Counterweight bearing 58 supports counterweight 46 for movement relative to drive housing 28. In some examples, counterweight bearing 58 is a linear bearing such that counterweight 46 can shift laterally along stabilizer disk 54 and relative to drive housing 28. It is understood that counterweight bearing 58 can extend any desired length along stabilizer disk 54 and drive housing 28. In one example, counterweight bearing 58 extends to an edge of drive housing 28 such that counterweight 46 can extend to the edge or beyond the edge of drive housing 28.

While stabilizer 40 is described as including counterweight 46 and displacement device 44, it is understood that stabilizer 40 can be of any suitable configuration for generating moment $M_2$. In some examples, displacement device 44 includes an extendable and rotating arm that supports counterweight 46 and is connected to stabilizer motor 42. With counterweight 46 mounted on the rotating arm, stabilizer 40 is able to generate a stabilizing moment that is counter to the articulating arm moment regardless of the direction of articulation. In some examples, displacement device 44 can be a piston, a screw, or any other suitable linear displacement device. Mounting stabilizer 40 outside of drive housing 28 allows counterweight 46 to extend beyond the edges of drive housing 28. In this way, stabilizer 40 can generate moment $M_2$ utilizing a lightweight counterweight 46 and a long displacement device 44 that can extend beyond the confines of drive housing 28. While stabilizer 40 is described as mounted on drive housing 28, it is understood that stabilizer 40 can be mounted at any desired location, such as within drive housing 28 or on an underside of stabilizer disk 54.

Rotator 50 is disposed within drive housing 28 and configured to drive the rotation of articulating arm 26 about axis A-A. Drive gear 72 and actuator gear 66 are disposed within drive housing 28. Drive gear 72 is intermeshed with actuator gear 66 such that drive gear 72 drives the rotation of actuator gear 66 about axis A-A. Rotation motor 70 is connected to and powers drive gear 72, and rotation motor 70 communicates with the hoist control system via communication link 76c, which can be a wired or wireless connection.

Connectors 74 extend between and connect actuator gear 66 and stabilizer disk 54 for simultaneous rotation about axis A-A. It is understood, that connectors 74 can be posts, walls, a lattice structure, or any other device suitable for interconnecting actuator gear 66 and stabilizer disk 54 for simultaneous rotation. Linking actuator gear 66 and stabilizer disk 54 for simultaneous rotation ensures that counterweight 46 is properly oriented on an opposite side of axis A-A from spool 64, such that moment $M_2$ is counter to moment $M_1$. Balance mass 52 is disposed within drive housing 28 and is sized and positioned to counter a moment created by components of end-effector 14 that are offset from axis A-A, such as rotation motor 70 and drive gear 72 in some examples.

During operation, end-effector 14 is lowered from aircraft 10 to an area proximate a target object. Articulating arm 26 is displaced to the articulated state (shown in FIG. 2C) to place attachment member 36 (shown in FIGS. 1A-1C) proximate the target object. Articulating arm 26 allows attachment member 36 to reach the target object even where the object is located at an inconvenient or potentially hazardous location, such as under an overhang, for example. The hoist control system onboard aircraft 10 communicates with actuator motor 62 via communication link 76a, communicates with stabilizer motor 42 via communication link 76b, and communicates with rotation motor 70 via communication link 76c.

The hoist control system commands actuator motor 62 to drive spool 64, thereby causing spool 64 to wind control cable 32a onto spool 64. Winding control cable 32a onto spool 64 shortens the portion of control cable 32a extending outside of drive housing 28, thereby causing articulating arm 26 to displace out of alignment with axis A-A and towards control cable 32a. As articulating arm 26 shifts to the articulated state, moment $M_1$ is created by articulating arm 26 shifting out of alignment with axis A-A.

As articulating arm 26 shifts to the articulated state, the hoist control system commands stabilizer 40 to generate moment $M_2$ to counter moment $M_1$ and maintain end-effector 14 in a balanced state. Moment $M_2$ is generated by stabilizer motor 42 driving counterweight 46 away from axis A-A a distance required to have moment $M_2$ cancel moment $M_1$. The hoist control system communicates with stabilizer motor 42 via communication link 76b and instructs stabilizer motor 42 to displace counterweight 46 the required distance. Stabilizer motor 42 drives displacement device 44, and displacement device 44 drives counterweight 46 the required distance.

In addition to displacing articulating arm 26 away from axis A-A, end-effector 14 can rotate articulating arm 26 about axis A-A, thereby providing a 360° delivery envelope within which articulating arm 26 can reach the target object. To rotate articulating arm 26, the hoist control system communicates with rotation motor 70 via communication link 76c and instructs rotation motor 70 to activate drive gear 72. Drive gear 72 rotates and in turn causes actuator gear 66 to rotate about axis A-A. Actuator gear 66 rotates articulating arm 26 about axis A-A due to the connection of control cables 32 to actuator gear 66. As actuator gear 66 rotates, stabilizer disk 54 simultaneously rotates about axis A-A because actuator gear 66 and stabilizer disk 54 are linked for simultaneous rotation by connectors 74. Connecting actuator gear 66 and stabilizer disk 54 for simultaneous rotation ensures that counterweight 46 is disposed opposite spool 64, thereby ensuring that moment $M_2$ counters moment $M_1$.

End-effector 14 provides significant advantages. A crewmember can communicate with and control end-effector 14 through the hoist control system and communication links 76a-76c. End-effector 14 enables the crew member to manipulate the position of attachment member 36 to allow attachment member 36 to reach the target object, even where the target object is located under an overhang or in some other inconvenient or potentially hazardous location. It is understood that the hoist control system can include any desired user interface to allow the crewmember to control end-effector 14. In some examples, the crewmember controls the actuation and rotation of articulating arm 26 through switches and knobs, such as via a joystick. In some examples, articulating arm 26 can include sensors, such as position sensors and cameras, to provide feedback to the crewmember during actuation and rotation.

End-effector 14 also provides an increased delivery envelope for attachment member 36. Moreover, end-effector 14 provides a compact, lightweight system for manipulating and controlling the position of articulating arm 26. In addition, end-effector 14 is sufficiently robust to operate in harsh environmental conditions. Controlling the position of attachment member 36 through the manipulation of articulating arm 26 further increases the safety of the crewmember and the target object, as the crewmember is not required to manually swing hoist cable 22 to reach an object displaced from axis A-A. Moreover, end-effector 14 allows the crewmember to maneuver attachment member 36 to the target object and to compensate for slight lateral movements of the object and aircraft 10, thereby simplifying the recovery process.

Figure 4:
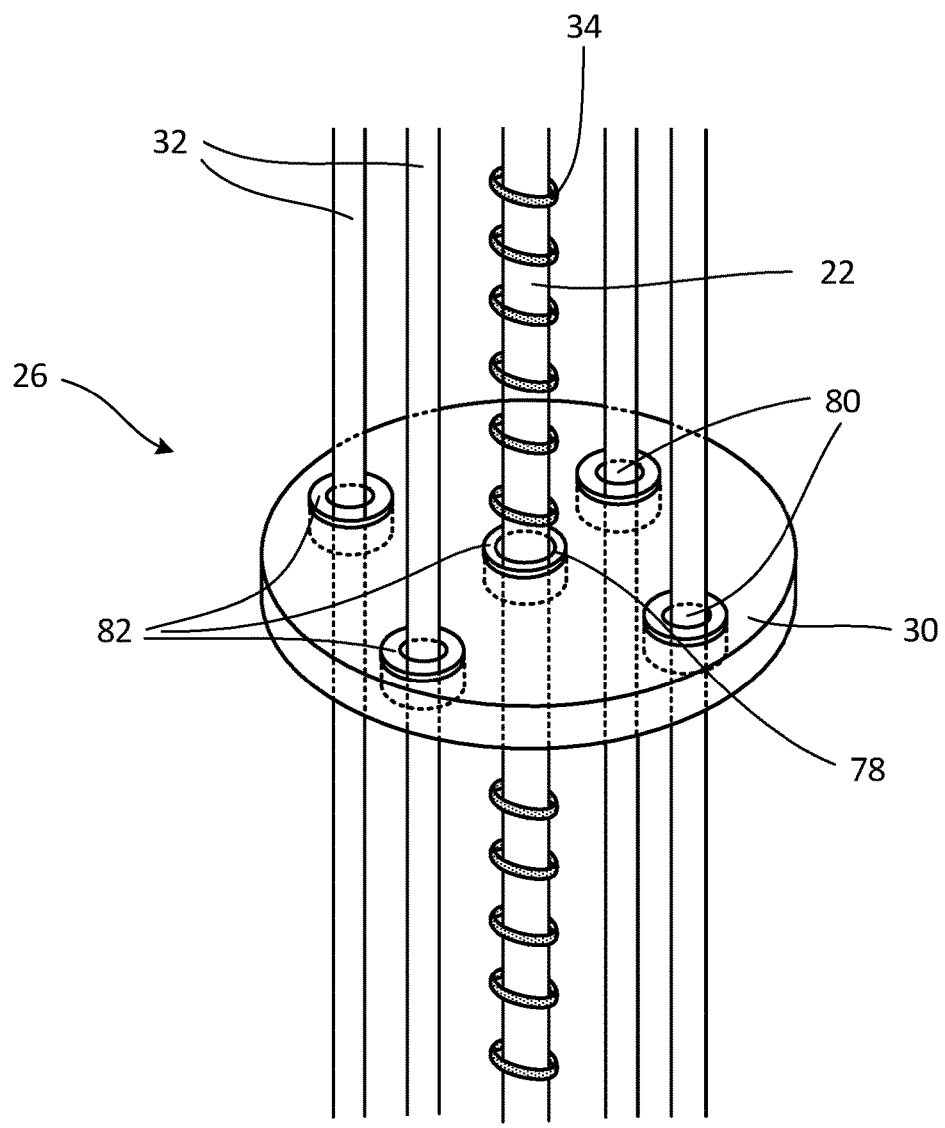
FIG. 4 is an isometric view of detail 4 of FIG. 2A.

FIG. 4 is an isometric view of detail 4 of FIG. 2A. Control cables 32, support disk 30, and elastic members 34 of articulating arm 26 are shown. Hoist cable 22 extends through articulating arm 26. Support disk 30 includes central aperture 78, perimeter apertures 80, and bushings 82. Bushings 82 are disposed in central aperture 78 and perimeter apertures 80. Control cables 32 extend through bushings 82 in perimeter apertures 80 of support disk 30. Hoist cable 22 extends through bushing 82 in central aperture 78 of support disk 30. Elastic members 34 are disposed about hoist cable 22 and extend between adjacent support disks 30.

Support disk 30 forms a joint within articulating arm 26 to enable articulating arm 26 to shift to and maintain position in the articulated state (shown in FIG. 2C). Bushings 82 allow control cables 32 and hoist cable 22 to slide through support disks 30 while preventing control cables 32 and hoist cable 22 from imparting excess wear on support disk 30. As such, control cables 32 and hoist cable 22 are not directly secured to support disk 30, in some examples.

Elastic members 34 maintain separation between adjacent support disks 30. It is understood that elastic members 34 can be compression springs wrapped about hoist cable 22, torsion springs disposed between support disks 30, or any other suitable elastic device for separating support disks 30. It is further understood that articulating arm 26 can include one or more elastic members 34 disposed between adjacent support disks 30. Elastic members 34 allow articulating arm 26 to collapse to the retracted state (shown in FIG. 2B), and elastic members 34 cause support disks 30 to separate and maintain a desired position when articulating arm 26 is in the extended state (shown in FIG. 2A).

To displace articulating arm 26, one of control cables 32 is retracted by drive 24 (best seen in FIGS. 3A and 3B), thereby causing support disk 30, and thus hoist cable 22, to displace towards the shortened control cable 32. As control cable 32 is retracted, the remaining control cables 32 and hoist cable 22 displace due to support disk 30 joining all control cables 32 and hoist cable 22 together. Elastic members 34 maintain the separation between each adjacent support disk 30 to allow support disks 30 to function as joints for articulating arm 26.

Support disks 30 provide significant advantages. Support disks 30 create joints in articulating arm 26 that allow articulating arm 26 to displace from axis A-A. Moreover, elastic members 34 facilitate an easy transition for articulating arm 26 between the retracted state and the expanded state by forcing support disks 30 apart. In addition, elastic members 34 enable a single cable to extend from rescue hoist 12 (shown in FIGS. 1A-1C) and through end-effector 14 (best seen in FIGS. 2A-2C), as elastic members 34 can support the weight of drive 24 (best seen in FIGS. 3A-3B) on the cable.

Figure 5:
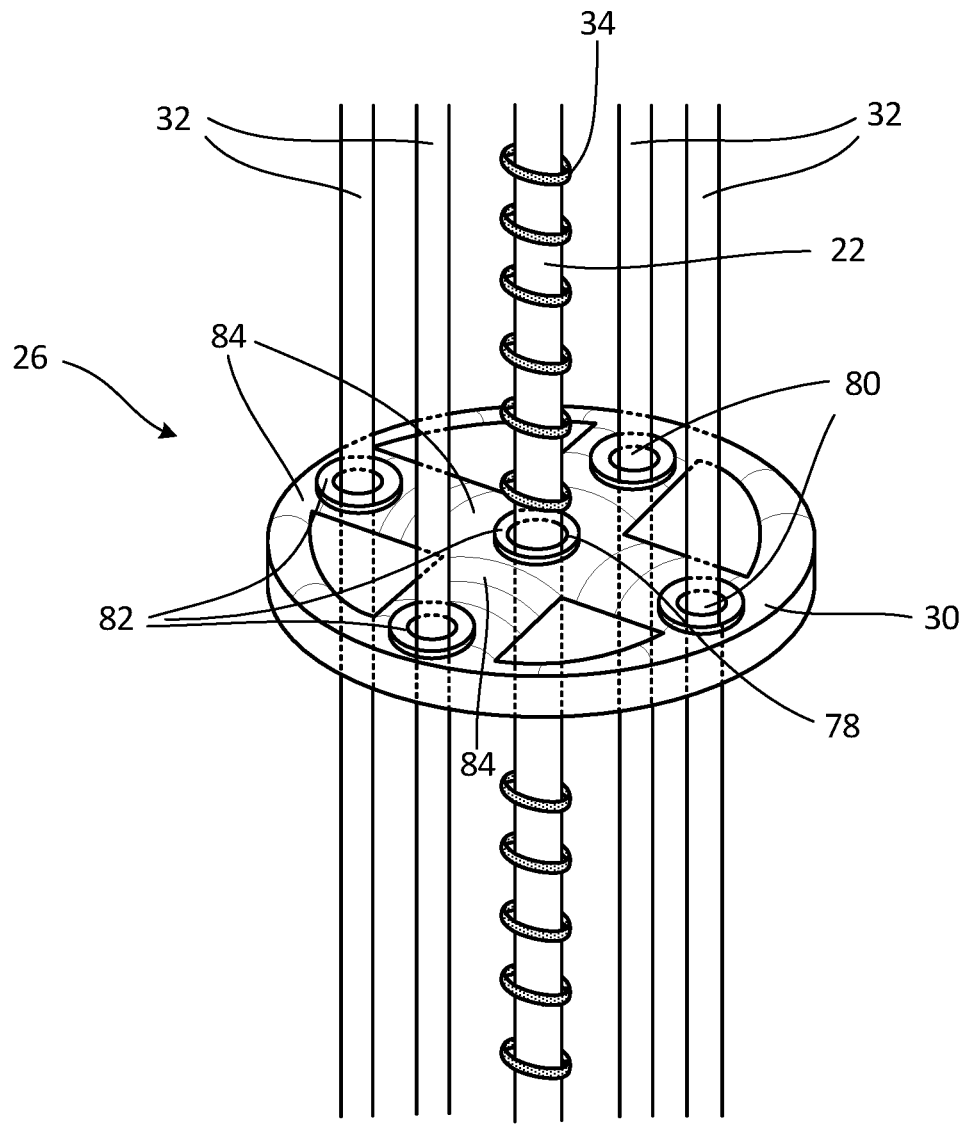
FIG. 5 is an isometric view of detail 5 of FIG. 2A.

FIG. 5 is an isometric view of detail 5 of FIG. 2A. Control cables 32, support disk 30, and elastic members 34 of articulating arm 26 are shown. Hoist cable 22 extends through articulating arm 26. Support disk 30 includes central aperture 78, perimeter apertures 80, bushings 82, and reinforcing protuberance 84. Bushings 82 are disposed in perimeter apertures 80 and central aperture 78. Reinforcing protuberances 84 extend across a diameter of support disk 30. Perimeter apertures 80 and central aperture 78 extend through at least one reinforcing protuberance 84. Control cables 32 extend through bushings 82 in perimeter apertures 80, and hoist cable 22 extends through bushing 82 in central aperture 78. Elastic members 34 extend between adjacent support disks 30.

Support disk 30 forms a joint within articulating arm 26 to enable articulating arm 26 to displace to and maintain position in the articulated state (shown in FIG. 2C). Bushings 82 allow control cables 32 and hoist cable 22 to slide through support disks 30 while preventing control cables 32 and hoist cable 22 from imparting excess wear on support disk 30. As such, control cables 32 and hoist cable 22 are not directly secured to support disk 30, in some examples. Elastic members 34 maintain separation between adjacent support disks 30. Reinforcing protuberances 84 extend across support disk 30 and provide increased strength to support disk 30 where control cables 32 and hoist cable 22 extend through support disk 30. In some examples, support disk 30 includes two reinforcing protuberance 84 arranged in a cross pattern, with central aperture 78 extending through the intersection of the two reinforcing protuberances 84. It is understood, however, that support disk 30 can include as many or as few reinforcing protuberances 84 as desired. In some examples, support disk 30 further includes a reinforcing protuberance 84 projecting from an edge of support disk 30 and joining each end of the reinforcing protuberances 84 extending across the diameter of support disk 30.

Reinforcing protuberances 84 provide significant advantages. Reinforcing protuberances 84 provide increased strength to support disks 30 while allowing support disks 30 to have a decreased weight. As such, reinforcing protuberances 84 require less robust elastic members 34 to maintain separation between support disks 30, also decreasing weight. As such, reinforcing protuberances 84 provide lightweight, robust support disks 30 that provide for a more efficient, lighter end-effector 14.

DISCUSSION OF POSSIBLE EMBODIMENTS

The following are non-exclusive descriptions of possible embodiments of the present invention.

An end-effector for a rescue hoist includes an articulating arm and a drive. The articulating arm includes a plurality of support disks, a plurality of control cables extending through the plurality of support disks, and a hoist cable extending through the plurality of support disks. The drive includes an actuator connected to a first one of the plurality of control cables and configured to deploy and retract the first one of the plurality of control cables to displace the articulating arm from an end-effector axis, and a stabilizer mounted on a drive housing and configured to generate a stabilizing moment in response to the articulating arm displacing from the end-effector axis.

The end-effector of the preceding paragraph can optionally include, additionally and/or alternatively, any one or more of the following features, configurations and/or additional components:

A rotator connected to the articulating arm, the rotator configured to rotate the articulating arm around the end-effector axis.

The rotator includes a drive gear and a rotation motor connected to the drive gear and configured to drive rotation of the drive gear. The actuator includes an actuator gear driven by the drive gear, wherein the plurality of control cables extend through the actuator gear such that rotating the actuator gear about the end-effector axis causes the control cables and the articulating arm to rotate about the end-effector axis, and an actuator motor mounted on the actuator gear, the actuator motor configured to deploy and retract the one of the plurality of control cables.

The actuator includes a spool disposed on the actuator gear, the spool connected to and driven by the actuator motor, wherein the first one of the plurality of control cables is wound on the spool.

A stabilizer disk mounted on the drive housing, wherein the stabilizer is mounted on the stabilizer disk, an actuator gear disposed within the drive housing, the actuator mounted on the actuator gear, and the plurality of control cables extending through the actuator gear, and at least one support extending between and connecting the stabilizer disk and the actuator gear for simultaneous rotation.

The rotator is directly connected to the actuator gear, the rotator configured to rotate the articulating arm through the actuator gear.

The stabilizer includes a stabilizer motor disposed on the drive housing, a displacement arm connected to and configured to be driven by the stabilizer motor, and a counterweight attached to the displacement arm. The stabilizer motor causes the displacement arm to displace the counterweight to thereby generate the stabilizing moment.

The stabilizer includes a stabilizer disk mounted on the drive housing, wherein the stabilizer motor is disposed on the stabilizer disk.

The counterweight is disposed on a linear bearing mounted on the stabilizer disk.

At least one support disk of the plurality of support disks includes a plurality of perimeter apertures extending through the at least one support disk proximate an edge of the at least one support disk, a central aperture extending through the at least one support disk, and a plurality of bushings disposed in the plurality of perimeter apertures and the central aperture. The plurality of control cables extend through the bushings disposed in the perimeter apertures, and the hoist cable extends through the bushing disposed in the central aperture.

The at least one support disk includes at least one reinforcing protuberance extending across a diameter of the support disk, wherein the central aperture extends through the reinforcing protuberance.

The at least one reinforcing protuberance includes a first reinforcing protuberance extending across a diameter of the support disk between a first one of the plurality of perimeter apertures and a second one of the plurality of perimeter apertures, and a second reinforcing protuberance extending across the diameter of the support disk between a third one of the plurality of perimeter apertures and a fourth one of the plurality of perimeter apertures.

The actuator is further configured to deploy and retract each of the plurality of control cables.

The actuator includes a plurality of actuator motors, each of the plurality of actuator motors configured to deploy and retract one of the plurality of control cables.

The stabilizer includes a stabilizer motor disposed on the drive housing, a displacement arm connected to and configured to be driven by the stabilizer motor, wherein the displacement arm is rotatable about the stabilizer motor, and a counterweight attached to the displacement arm. The stabilizer motor causes the displacement arm to displace the counterweight to create the stabilizing moment.

A rescue hoist includes a hoist housing, an effector cable extending from the hoist housing, and an end-effector disposed at a distal end of the effector cable. The end-effector includes an articulating arm and a drive. The articulating arm includes a plurality of support disks, a plurality of control cables extending through the plurality of support disks, and a hoist cable extending through the plurality of support disks. The drive includes an actuator connected to a first one of the plurality of control cables and configured to deploy and retract the first one of the plurality of control cables to displace the articulating arm from an end-effector axis, and a stabilizer mounted on a drive housing and configured to generate a stabilizing moment in response to the articulating arm displacing from the end-effector axis.

The rescue hoist of the preceding paragraph can optionally include, additionally and/or alternatively, any one or more of the following features, configurations and/or additional components:

A plurality of support cables extending from a distal end of the effector cable, the plurality of support cables connected to and supporting the drive housing.

The hoist cable extends from the hoist housing and through the articulating arm.

The hoist cable comprises a portion of the effector cable extending through the drive.

A plurality of springs disposed between adjacent ones of the plurality of support disks, the springs supporting the drive on the effector cable.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. An end-effector for a hoist, the end-effector comprising:
an articulating arm comprising:
a plurality of support disks;
a plurality of control cables extending through the plurality of support disks; and
a hoist cable extending through the plurality of support disks; and
a drive comprising:
an actuator connected to one of the plurality of control cables and configured to deploy and retract the one of the plurality of control cables to displace the articulating arm from an end-effector axis; and
a stabilizer mounted on a drive housing and configured to generate a stabilizing moment in response to the articulating arm displacing from the end-effector axis.

2. The end-effector of claim 1, further comprising:
a rotator connected to the articulating arm, the rotator configured to rotate the articulating arm around the end-effector axis.

3. The end-effector of claim 2, wherein:
the rotator comprises:
a drive gear disposed within the drive housing; and
a rotation motor connected to the drive gear and configured to drive rotation of the drive gear; and
the actuator comprises:
an actuator gear disposed within the drive housing, wherein the actuator gear is driven by the drive gear and the plurality of control cables extend through the actuator gear such that rotating the actuator gear about the end-effector axis causes the control cables and the articulating arm to rotate about the end-effector axis; and
an actuator motor mounted on the actuator gear, the actuator motor configured to deploy and retract the one of the plurality of control cables.

4. The end-effector of claim 3, the actuator further comprising:
a spool disposed on the actuator gear, the spool connected to and driven by the actuator motor;
wherein the one of the plurality of control cables is wound on the spool.

5. The end-effector of claim 2, further comprising:
a stabilizer disk mounted on the drive housing, wherein the stabilizer is mounted on the stabilizer disk;
an actuator gear disposed within the drive housing, the actuator mounted on the actuator gear, and the plurality of control cables extending through the actuator gear; and
at least one support extending between and connecting the stabilizer disk and the actuator gear for simultaneous rotation.

6. The end-effector of claim 5, wherein the rotator is directly connected to the actuator gear, the rotator configured to rotate the articulating arm through the actuator gear.

7. The end-effector of claim 1, the stabilizer further comprising:
   a stabilizer motor disposed on the drive housing;
   a displacement arm connected to and configured to be driven by the stabilizer motor; and
   a counterweight attached to the displacement arm;
   wherein the stabilizer motor causes the displacement arm to displace the counterweight to thereby generate the stabilizing moment.

8. The end-effector of claim 7, the stabilizer further comprising:
   a stabilizer disk mounted on the drive housing, wherein the stabilizer motor is disposed on the stabilizer disk.

9. The end-effector of claim 8, wherein the counterweight is disposed on a linear bearing mounted on the stabilizer disk.

10. The end-effector of claim 1, wherein at least one support disk of the plurality of support disks comprises:
    a plurality of perimeter apertures extending through the at least one support disk proximate an edge of the at least one support disk;
    a central aperture extending through the at least one support disk; and
    a plurality of bushings disposed in the plurality of perimeter apertures and the central aperture;
    wherein the plurality of control cables extend through the bushings disposed in the perimeter apertures, and the hoist cable extends through the bushing disposed in the central aperture.

11. The end-effector of claim 10, wherein the at least one support disk further comprises:
    at least one reinforcing protuberance extending across a diameter of the support disk, wherein the central aperture extends through the reinforcing protuberance.

12. The end-effector of claim 11, wherein the at least one reinforcing protuberance comprises:
    a first reinforcing protuberance extending across a diameter of the support disk between a first one of the plurality of perimeter apertures and a second one of the plurality of perimeter apertures; and
    a second reinforcing protuberance extending across the diameter of the support disk between a third one of the plurality of perimeter apertures and a fourth one of the plurality of perimeter apertures.

13. The end-effector of claim 1, wherein the actuator is further configured to deploy and retract each of the plurality of control cables.

14. The end-effector of claim 13, the actuator further comprising:
    a plurality of actuator motors, each configured to deploy and retract one of the plurality of control cables.

15. The end-effector of claim 14, the stabilizer further comprising:
    a stabilizer motor disposed on the drive housing;
    a displacement arm connected to and configured to be driven by the stabilizer motor, wherein the displacement arm is rotatable about the stabilizer motor; and
    a counterweight attached to the displacement arm;
    wherein the stabilizer motor causes the displacement arm to displace the counterweight to create the stabilizing moment.

16. A rescue hoist comprising:
    a hoist housing;
    an effector cable extending from the hoist housing; and
    an end-effector disposed at a distal end of the effector cable, the end-effector comprising:
      an articulating arm comprising:
        a plurality of support disks;
        a plurality of control cables extending through the plurality of support disks; and
        a hoist cable extending through the plurality of support disks; and
      a drive comprising:
        an actuator connected to one of the plurality of control cables and configured to deploy and retract the one of the plurality of control cables to displace the articulating arm from an end-effector axis; and
        a stabilizer mounted on a drive housing and configured to generate a stabilizer moment in response to the articulating arm displacing from the end-effector axis.

17. The rescue hoist of claim 16, further comprising:
    a plurality of support cables extending from a distal end of the effector cable, the plurality of support cables connected to and supporting the drive housing.

18. The rescue hoist of claim 17, wherein the hoist cable extends from the hoist housing and through the articulating arm.

19. The rescue hoist of claim 16, wherein the hoist cable comprises a portion of the effector cable extending through the drive.

20. The rescue hoist of claim 19, further comprising a plurality of springs disposed between adjacent ones of the plurality of support disks, the springs supporting the drive on the effector cable.

* * * * *